Feb. 5, 1929.
L. K. SNELL
1,700,860
CLUTCH
Original Filed Feb. 26, 1921
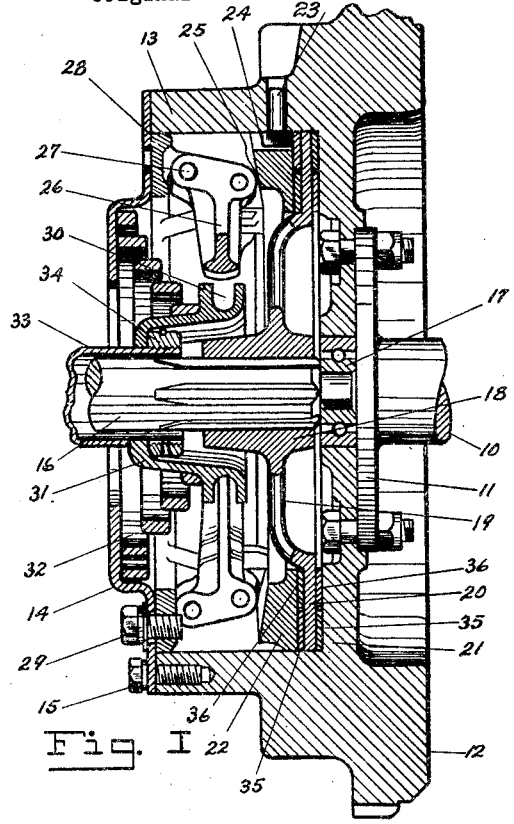
Fig. I
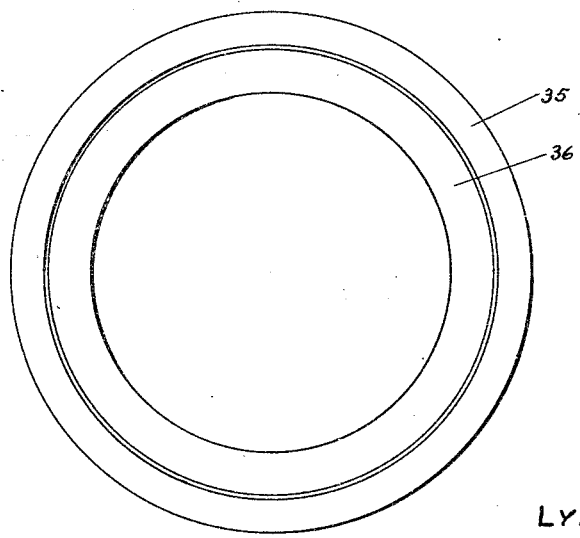
Fig. II
INVENTOR.
LYLE K. SNELL
BY Solon J. Boughton
ATTORNEY.

Patented Feb. 5, 1929.

1,700,860

UNITED STATES PATENT OFFICE.

LYLE K. SNELL, OF DETROIT, MICHIGAN, ASSIGNOR TO THE WILLYS-OVERLAND COMPANY, OF TOLEDO, OHIO, A CORPORATION OF OHIO.

CLUTCH.

Original application filed February 26, 1921, Serial No. 448,138. Divided and this application filed February 11, 1926. Serial No. 87,479.

This invention relates to improvements in clutches, particularly clutches of the disc type adaptable to automobile use, and this application is a division of my co-pending application Serial No. 448,138, filed Feb. 26, 1921.

One of the objects of the invention is to provide a clutch of the disc type in which the friction rings engage progressively.

Another object of the invention is to provide a disc clutch in which the overall length is small.

A further object of the invention is to provide a disc clutch with friction rings having different effective diameters.

Other objects, and objects relating to details of construction and economies of manufacture will appear as I proceed with the description of that embodiment of the invention which, for the purposes of the present application, I have illustrated in the accompanying drawings, in which:

Figure I is a central, longitudinal section through a clutch and related parts showing the position of the friction rings of the improved clutch.

Fig. II is a front elevation of a pair of the friction rings shown in Fig. I, the rings being arranged concentrically so as to illustrate their relative position in the assembled clutch.

Referring to the drawings, in which like reference characters refer to similar parts throughout the views, 10 indicates a power shaft which may be the crankshaft of an internal combustion engine. This power shaft carries a plate 11 to which is bolted a flywheel 12. An annular flange 13 upon the flywheel constitutes the side or peripheral wall of a clutch casing, of which one end wall is the flywheel while the other end wall consists of a cover 14 open at the middle and removably secured to the flange 13 by means of machine screws 15.

A driven shaft 16 is aligned with the driving shaft 10 as nearly as may be, the inner end of the shaft 16 being reduced and mounted in a ball bearing 17 located in the center of the flywheel. The shaft 16 carries a hub 18, there being a splined connection between the two parts to permit sliding of the hub upon the shaft. This hub merges into a spider 19, at the rim of which is the driven plate 20 of the clutch. The portion 21 of the flywheel lying opposite this plate constitutes one of the driving plates of the clutch. The other driving plate 22 is movable toward and away from the plates 20 and 21, and is prevented from rotational movement with respect to plate 21, by pins 23 which are set into the flywheel and which are slidable in slots 24 across the periphery of the plate 22.

The rear face of plate 22 is inclined as shown clearly in the drawings. This face is engaged by cam surfaces 25 upon the levers 26, which are pivoted at 27 to ears projecting inwardly from a ring 28 mounted upon the inner side of the cover 14 by means of screws 29. The power arms of the levers are relatively long, and their inner ends extend into a groove 30 upon the outer side of a cup-shaped element 31, which is normally urged inwardly by a heavy coil spring 32, and which may be retracted by means of a sleeve 33 surrounding the shaft 16, and extending into the cup-shaped element 31. A collar 34 is threaded upon the end of the sleeve 33 and bears against the element 31 to retract the same when the sleeve 33 is moved backward, or toward the left in Fig. I. This movement of sleeve 33 toward the left is accomplished in any known manner, preferably by the operation of a foot pedal, not shown.

In clutches of the type illustrated it has been customary to employ a single friction ring usually of asbestos fiber, upon each side of the central clutch plate 20. If these rings are permitted to move independently, four sets of friction surfaces are thus provided for each clutch. This number of surfaces is not sufficient to insure smooth engagement however, and I propose to increase the number of friction surfaces without increasing the number of movable plates, making some of the surfaces of a larger diameter than others so that a given pressure will result in a greater torque being delivered by the larger surfaces.

In Fig. I, I have shown two friction rings 35 and 36 on each side of the central clutch plate 20. The two rings of a pair lie in the same plane and if desired one ring, preferably the outer, may be purposely slightly thicker than the other. Although I have only shown two pairs of rings 35 and 36, a larger number may be employed if desired.

It is well known that the holding power of clutches of the type illustrated is dependent on the friction and the distance of the friction surface from the clutch axis. This being true it may be readily seen that with rings of equal thickness the outer rings 35 will assume the load slightly in advance of the inner rings 36 and that if the outer rings be of slightly greater thickness the effect will be increased. The progressive action of the rings 35 and 36 in assuming their share of the load produces a much smoother clutch action than that produced by the use of single rings and the positioning of the rings of each pair in the same plane reduces the length as compared with an ordinary clutch using the same number of friction rings.

While my invention contemplates the use of rings 35 and 36 of slightly different thickness, I prefer to cut both rings of the same stock as this will be found to produce a sufficient amount of lag between the full engagement of the respective rings.

I am aware that the particular embodiments of my invention herein shown and described are susceptible of considerable variation without departing from the spirit of the invention, and therefore I desire to claim the invention broadly as well as specifically, as indicated in the appended claims.

I claim:

1. In a clutch, relatively movable driving and driven plates, and a plurality of concentric friction rings interposed between said plates, said rings being rotatably movable independently of each other.

2. In a clutch, relatively movable driving and driven plates, and a plurality of uninterrupted concentric friction rings interposed between said plates, said rings being rotatably movable independently of each other and of the said driving and driven plates.

3. In a clutch, relatively movable driving and driven plates, and a plurality of flat friction rings interposed between said plates, certain of said rings having a substantially greater diameter than certain others of said rings, and said larger rings being independently rotatably movable with respect to said smaller rings.

4. In a clutch, relatively movable driving and driven plates, friction rings interposed between said plates, said friction rings being arranged in sets, and each of said sets consisting of a plurality of concentric rings disposed in substantially the same plane.

In testimony whereof, I affix my signature.

LYLE K. SNELL.